(12) United States Patent
Yamaba et al.

(10) Patent No.: US 6,295,131 B1
(45) Date of Patent: Sep. 25, 2001

(54) INTERFERENCE DETECTING SYSTEM FOR USE IN INTERFEROMETER

(75) Inventors: Tuneo Yamaba, Odawara; Kenji Aikou, Naka-gun; Shigeru Serikawa, Chigasaki; Hideo Ishimori, Ashigarakami-gun, all of (JP)

(73) Assignee: Hitachi Electronics Engineering Co., Ltd. (JP)

( * ) Notice: Subject to any disclaimer, the term of this patent is extended or adjusted under 35 U.S.C. 154(b) by 0 days.

(21) Appl. No.: 09/252,957

(22) Filed: Feb. 18, 1999

(30) Foreign Application Priority Data

Feb. 20, 1998 (JP) .................................. 10-056030
Feb. 20, 1998 (JP) .................................. 10-056031

(51) Int. Cl.[7] ...................................... G01B 9/02
(52) U.S. Cl. ............................... 356/493; 356/507
(58) Field of Search ........................ 356/351, 491–493, 356/507

(56) References Cited

U.S. PATENT DOCUMENTS 5,557,399 * 9/1996 de Groot ............................ 356/357
5,644,562 * 7/1997 de Groot ............................ 369/110
5,699,160 * 12/1997 Barenboim et al. ................ 356/359
5,872,629 * 2/1999 Colvard ............................. 356/349

FOREIGN PATENT DOCUMENTS 8-114431   5/1996 (JP) .
8-220003   8/1996 (JP) .

* cited by examiner

Primary Examiner—Frank G. Font
Assistant Examiner—Phil Natividad
(74) Attorney, Agent, or Firm—Morrison & Foerster

(57) ABSTRACT

Interference light occurring between a first laser light of a reference phase and a second laser light of a measuring phase is divided via a light divider into two interference light beams to be directed in two directions. One of the divided interference light beams is received by a polarizing light separator, which separates components of the first and second laser lights from the received interference light beam. First and second light detectors convert respective light energy of the separated components into corresponding electric signals. Adder adds together the converted electric signals. Third light detector converts light energy of the other divided interference light beam into an electric signal. Comparator compares the electric signal from the third light detector with the output of the adder as a reference value, to generate a detection output of a predetermined phase. In an alternative, the output from the adder is subtracted from the converted electric signal from the third light detector and a square root of a product between the electric signals output from the first and second light detector is evaluated, so that a signal, indicative of interference intensity of the interference light occurring between the first and second laser lights, is provided by dividing the output of the subtracter by the square root.

7 Claims, 9 Drawing Sheets

$t=100 nsec$
$(\delta=266nm)$

INTERFERENCE DETECTING SYSTEM FOR USE IN INTERFEROMETER

BACKGROUND OF THE INVENTION

The present invention relates generally to interferometers for precise measurement of microscopic distances or level differences or microscopic asperities of the surface of an object, which are suitable for use in precisely detecting defects in the surface of a disk-shaped recording medium such as a magnetic or optical disk. More particularly, the present invention relates to an improved interference detecting system for use in an interferometer to detect an interference phase or interference intensity.

In recent years, most personal computers come with a hard disk device as their standard equipment, and a great majority of these hard disk devices have a capacity as great as a few giga-bytes. Further, there has been an increasing demand that notebook-sized personal computers be capable of incorporating therein an internal hard disk device that achieves high-density recording and is yet compact in size.

Generally speaking, in order to achieve increased recording density by the hard disk device, it is necessary to minimize the floating amount or distance of its magnetic head from the surface of the magnetic disk, say, down to the order of 20 to 50 nm. When the magnetic disk for use with such a hard disk device is inspected or tested for surface defects, the inspection has to be performed with such detection accuracy corresponding to the floating amount of the magnetic head.

So far, the inspection for magnetic disk surface defects has been carried out using a device which is commonly called a "glide tester". Each of the traditional glide testers causes the magnetic disk to rotate with a preset floating amount, during which it detects how many times the magnetic head has collided with abnormal or intolerably-high projections on the disk surface. Then, on the basis of the detected number of the collisions, the glide tester determines the glide levels (i.e., heights of the projections on the surface) of the magnetic disk.

However, if the magnetic head is set to an extremely small floating amount, e.g., on the order of 20–50 nm, then the number of the collisions becomes correspondingly greater. The increased collisions of the magnetic head against the disk surface projections are quite undesirable in that they would often damage the magnetic head and thus require replacement of the damaged head, positioning of a new (replacing) magnetic head, etc., which are very time-consuming.

Japanese Patent Laid-open Publication No. HEI-8-114431 discloses one example of the glider tester, which is designed to detect abnormal projections on the disk surface by measuring the floating amount of the magnetic head in an optical manner. However, the disclosed test glider thus arranged still can not provide a solution to the above-discussed problem.

To solve the problem, the recent trend in the art is toward optically detecting heights of abnormal projections on the disk surface in order to perform a disk surface inspection similar to that performed by the glide testers, and devices intended for such an inspection are called "optical glide testers". One example of such optical glide testers is disclosed in Japanese Patent Laid-open Publication No. HEI-8-220003, which is designed to determine surface defects, in the form of asperities, of the disk by irradiating light onto the disk surface at a predetermined angle and closely examining the reflections of the light off the disk surface. The disclosed optical glide tester requires very complicated know-how for the examination of the reflected light and analysis of the surface asperities based thereon, but, despite the use of the complicated know-how, it could not perform the surface defect inspection with ease.

Among the conventionally-known optical measuring techniques is a precise interferometer-based measuring technique. Generally, the interferometer divides coherent laser light into two light beams via a beam splitter so as to irradiate one of the divided beams (reference beam) onto a predetermined reference surface and irradiate the other divided beam (measuring beam) onto a predetermined surface to be measured (hereinafter called a "test surface"). Then, the interferometer combines together respective reflections of the two irradiated beams and detects light interference conditions in the combined reflection (interference light), to thereby detect level differences in stepped regions and asperities of the disk surface. In this case, the interference detection is generally made on the basis of two detecting principles: an interference-phase detecting principle; and an interference-intensity detecting principle. The interference-phase detecting principle is intended to detect a phase of the interference light, while the interference-intensity detecting principle is intended to detect intensity of the interference light. If the reflections of the reference and measuring beams are exactly in phase with each other, then the interference light presents no phase difference relative to a predetermined reference phase (e.g., a phase of the reference beam) and presents maximum intensity. However, once the reflection of the measuring beam gets out of phase with the reference beam, there would occur a corresponding phase difference in the interference light along with corresponding attenuation of the interference light intensity. Consequently, any level differences in stepped regions and asperities of the test surface can be detected irrespective of which of the interference-phase and interference-intensity detecting principles is employed for the surface defect inspection.

Thus, a more sophisticated or advanced optical glide tester may be provided by applying the known detecting principles for an interferometer; however, mere application of the known detecting principles would result in the following problem. Namely, the interference-phase and interference-intensity detecting techniques employed in the conventional interferometers are directed only to light interference detection based on "distance components", such as level differences in stepped regions and asperities on the test surface, and never take into account variation in reflectivity of the test surface. Consequently, the significant problem would be encountered that the detecting accuracy decreases due to successive variation in the reflectivity of the test surface. More specifically, due to the fact that variation in the reflectivity of the test surface causes variation in the interference light level involving fluctuations in level at and around its amplitude center (zero phase), it is difficult for the interference-phase detecting technique to accurately detect the the zero-cross point phase for precise measurement of phase differences, which would thus unavoidably lead to reduced detection accuracy. Further, because the variation in the reflectivity of the test surface involves fluctuations in the interference light level, the interference-intensity detecting technique can not detect interference intensity that exactly corresponds only to "distance components" such as level differences in stepped regions and asperities of the test surface.

SUMMARY OF THE INVENTION

It is therefore an object of the present invention to provide an interference detecting system for use in an interferometer which, irrespective variation in reflectivity of a test surface, can accurately measure an interference phase that exactly corresponds to a distance component such as a level difference in a stepped region, height of a projection or other asperity on the test surface.

It is another object of the present invention to provide an interference detecting system for use in an interferometer which, irrespective variation in reflectivity of a test surface, can accurately measure interference intensity that exactly corresponds to a distance component such as a level difference in a stepped region, height of a projection or other asperity on the test surface.

According to a first aspect of the present invention, there is provided an interference detecting system for detecting a phase of interference light occurring between a first laser light of a reference phase and a second laser light of a measuring phase, which comprises: a light divider that divides the interference light into two interference light beams to be directed in two directions; a polarizing light separator that receives one of the interference light beams divided by the light divider and separates components of the first and second laser lights from the interference light received thereby; first and second light detectors that convert respective light energy of the components separated by the first and second light detectors into corresponding electric signals; an arithmetic operator that performs an arithmetic operation between the electric signals outputted by the first and second light detectors; a third light detector that converts light energy of another of the interference light beams divided by the light divider into a corresponding electric signal; and a comparator that compares the electric signal outputted by the third light detector with an output of the arithmetic operator as a reference value, to generate a detection output of a predetermined phase.

In this type of interferometer, the first laser light of the reference phase is one reflected off a reference surface, while the second laser light of the measuring phase is one reflected off a test surface. The light divider divides each of these first and second laser lights in two directions. One of the laser light beams thus divided via the light divider is sent to a polarizing light separator, which separates two polarized components (i.e., components of the first and second laser lights) from the one laser light beam. Namely, because the first laser light of the reference phase and the second light of the measuring phase have different polarization, the respective components of the first and second laser lights are separated from each other by being thus polarized via the polarizing light separator. The thus-separated laser light components are then converted into corresponding electric signals via the first and second light detectors, respectively. By the arithmetic operator performing an arithmetic operation (typically, an addition) between the electric signals output from the first and second light detectors, a comparison reference voltage (slice voltage) can be provided which corresponds to a predetermined phase (e.g., an amplitude center) of the interference light. In the meantime, the other interference light beam is converted via the third light detector into a corresponding electric signal. The comparator compares the output electric signal from the third light detector with the output from the arithmetic operator as a reference value, to thereby generate a detection output of the predetermined phase. By thus determining the comparison reference voltage (slice voltage) directly from the first and second laser light components, the comparison reference voltage (slice voltage) is allowed to more accurately follow reflectivity variation on the test surface, which would be caused by each foreign matter present on the test surface, than the traditional approach where the comparison reference voltage is determined on the basis of electric signals converted from detected interference light. As a consequence, it is possible to detect a predetermined phase (e.g., a phase corresponding to an amplitude center) of the interference light without involving errors. Further, because the thus-determined comparison reference voltage (slice voltage) is also of an accurate instantaneous value corresponding exactly to variation of the interference light signal, a predetermined phase (e.g., a phase corresponding to an amplitude center) of the interference light can be detected even more accurately.

The present invention also provides an interference detecting system for detecting an interference phase of interference light occurring between a first laser light of a reference phase and a second laser light of a measuring phase, which comprise: a polarizing light separator that extracts, out of the interference light, two polarized light components phase-shifted from each other by 180°; a first light detector that receives one of the light components extracted by the polarizing light separator and outputs an electric signal corresponding to the light component received thereby; a second light detector that receives another of the light components extracted by the polarizing light separator and outputs an electric signal corresponding to the light component received thereby; an arithmetic operator that performs an arithmetic operation between the electric signals outputted by the first and second light detectors; and a comparator that compares the electric signal outputted by one of the first and second light detectors with an output of the arithmetic operator as a reference value, to thereby generate a detection output of a predetermined phase.

The polarizing light separator divides the interference light in two directions (i.e., transmitted and reflected light beams) and causes the thus-divided light beams to be phase-shifted from each other by 180°. Namely, the respective polarization planes of the first and second laser lights lie orthogonal to each other, so that placing the polarizing light separator or beam splitter in such a manner that its orthogonal axes lie at an angle of 45° to the first and second laser lights can cause the divided light beams to be phase-shifted from each other by 180°. One of the divided light beams is converted via the first light detector into a corresponding electric signal which is hereinafter also called an interference output signal. Similarly, the other divided light beam is converted via the second light detector into a corresponding electric signal. Because one of the measuring and test beams is phase-shifted by 180° from the other beam, a comparison reference voltage (slice voltage) corresponding to a predetermined phase (e.g., an amplitude center) of the interference light, by just performing an arithmetic operation (typically, an addition) between the electric signals output from the first and second light detectors. The comparator generates a detection output of the predetermined phase by comparing the electric signal output from one of the first and second light detectors with the output of the arithmetic operator as a reference value. By thus determining the comparison reference voltage (slice voltage) directly from the first and second laser lights, the comparison reference voltage (slice voltage) is allowed to accurately follow reflectivity variation that would be caused by each foreign matter present on the test surface. As a consequence, it is possible to detect a predetermined phase (e.g., a phase corresponding to an amplitude center) of the interference light without involving errors. Further, because the thus-determined comparison reference voltage (slice voltage) is also of an accurate instantaneous value corresponding exactly to variation of the interference light signal, a predetermined phase (e.g., a phase corresponding to an amplitude center) of the interference light can be detected even more accurately. Another benefit afforded by this arrangement is that only two light detectors suffice for the intended detection.

The present invention also provides an interference detecting system for detecting an interference phase of interference light occurring between a first laser light of a reference phase and a second laser light of a measuring phase, which comprises: a polarizing light separator that extracts, out of the interference light, two polarized light components phase-shifted from each other by 180°; a first light detector that receives one of the light components extracted by the polarizing light separator and outputs an electric signal corresponding to the light component received thereby; a second light detector that receives another of the light components extracted by the polarizing light separator and outputs an electric signal corresponding to the light component received thereby; and a comparator that compares the electric signal outputted by the first and second light detectors, to thereby generate a detection output of a predetermined phase.

This interference detecting system is based on the idea that because the output signals from the first and second light detectors are phase-shifted from each other by 180°, a predetermined phase (i.e., a phase corresponding to an amplitude center) of the interference light can be detected by merely comparing the output signals without a need for generating the above-mentioned comparison reference voltage (slice voltage). With this arrangement, the predetermined phase (i.e., one corresponding to an amplitude center) of the interference light automatically becomes a comparison reference voltage (slice voltage) and can be detected accurately in quick response to variation of the interference light signal, irrespective of variation in the reflectivity of the test surface. In this case too, only two light detectors are sufficient for the intended detection.

According to another aspect of the present invention, there is provided an interference detecting system for detecting intensity of interference light occurring between a first laser light of a reference phase and a second laser corresponding electric signals via the first and second light detectors, respectively. The electric signals from the first and second light detectors are added together via the adder, and the third light detector outputs an electric signal indicative of the light energy of the other interference light beam. Then, the subtracter subtracts the output of the adder from the output of the third light detector, the first arithmetic operator evaluates a square root of a product between the electric signals output from the first and second light detectors, and thereafter the second arithmetic operator divides the output of the subtracter by the output of the first arithmetic operator. In this way, the division result, i.e., quotient, provided by the divider is free of any reflectivity-related coefficients and hence has no influence of variation in the reflectivity. Thus, this arrangement permits accurate detection of interference intensity corresponding to a phase difference between the first laser light reflected off the reference surface and the second laser light reflected off the test surface.

The present invention also provides an interference detecting system for detecting interference intensity of interference light occurring between a first laser light of a reference phase and a second laser light of a measuring phase, which comprises: a polarizing light separator that extracts, out of the interference light, two polarized light components phase-shifted from each other by 180°; a first light detector that receives one of the light components extracted by the polarizing light separator and outputs an light of a measuring phase, which comprises: a light divider that divides the interference light into two interference light beams to be directed in two directions; a polarizing light separator that receives one of the interference light beams from the light divider and separates components of the first and second laser lights from the interference light received thereby; first and second light detectors that convert respective light energy of the components separated by the polarizing light separator into electric signals; an adder that adds together the electric signals outputted by the first and second light detectors; a third light detector that converts light energy of another of the interference light beams from the light divider into an electric signal; a subtracter that subtracts an output of the adder from an output of the third light detector; a first arithmetic operator that evaluates a square root of a product between the electric signals outputted by the first and second light detectors; and a second arithmetic operator that divides an output of the subtracter by an output of the first arithmetic operator, to provide a signal indicative of interference intensity of the interference light occurring between the first and second laser lights.

Because the first laser light of the reference phase and the second light of the measuring phase have different polarization, the respective components of the first and second laser lights are separated from each other by being polarized via the polarizing light separator. The thus-separated laser light components are then converted into electric signal corresponding to the light component received thereby; a second light detector that receives another of the light components extracted by the polarizing light separator and outputs an electric signal corresponding to the light component received thereby; an adder that adds together the electric signals outputted by the first and second light detectors; a subtracter that subtracts the electric signal outputted by the second light detector from the electric signal outputted by the first light detector; and an arithmetic operator that divides an output of the subtracter by an output of the adder, to thereby generate a signal indicative of the interference intensity of the interference light occurring between the first and second laser lights.

The polarizing light separator divides the interference light in two directions (i.e., into transmitted and reflected light beams) and causes the thus-divided light beams to be phase-shifted from each other by 180°. Namely, because the respective polarization planes of the first and second laser lights lie orthogonal to each other, placing the polarizing light separator or beam splitter in such a manner that its orthogonal axes lie at an angle of 45° to the first and second laser lights can cause the divided light beams to be phase-shifted from each other by 180°. One of the divided light beams is converted via the first light detector into a corresponding electric signal, i.e., interference output signal. Similarly, the other divided light beam is converted via the second light detector into a corresponding electric signal. Because one of the measuring and test beams is phase-shifted by 180° from the other beam, the adder, which adds together the output signals from the first and second light detectors, can provide a signal depending on the reflectivity. Further, by the subtracter subtracting the output electric signal of the second light detector from the output electric signal of the first light detector, an ultimately-obtained signal has a minimized influence of variation in the reflectivity of the test surface, so that it is possible to make accurate detection of interference intensity corresponding to a phase difference between the first laser light and the second laser light. Although the influence of the reflectivity can not be eliminated completely, the ultimate signal can have a practically satisfactory quality. In this case too, only two light detectors are sufficient for the intended detection.

According to still another aspect of the present invention, there is provided an interferometer which comprises: a laser beam generator that generates two parallel laser beams; optics that divide one of the two parallel laser beams into first and second laser light beams and irradiate the first laser light beams onto a predetermined reference surface and the second laser light beams onto a first point of a test surface to thereby generate a first interference light comprising a combination of respective reflections of the first and second laser light beams, the optics also dividing another of the two parallel laser beams into third and fourth laser light beams and irradiating the third laser light beam onto the predetermined reference surface and the fourth laser light beam onto a second point of the test surface to thereby generate a second interference light comprising a combination of respective reflections of the third and fourth laser light beams; and an interference detector section that detects interference phase and intensity of the first interference light to thereby provide first detection data for the first point of the test surface irradiated by the second laser light beam and also detects interference phase and intensity of the second interference light to thereby provide second detection data for the second point of the test surface irradiated by the fourth laser light beam. Thus, a level difference between the first and second points of the test surface can be detected on the basis of a difference between the first and second detection data. It will be appreciated that the interference detector section employed in this interferometer may comprise any one of the above-mentioned interference detecting systems of the invention.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

First of all, with reference to FIGS. 1 to 8, a description will be made about several embodiments of an interference-phase detecting technique for use in an interferometer according to the present invention.

Figure 1:
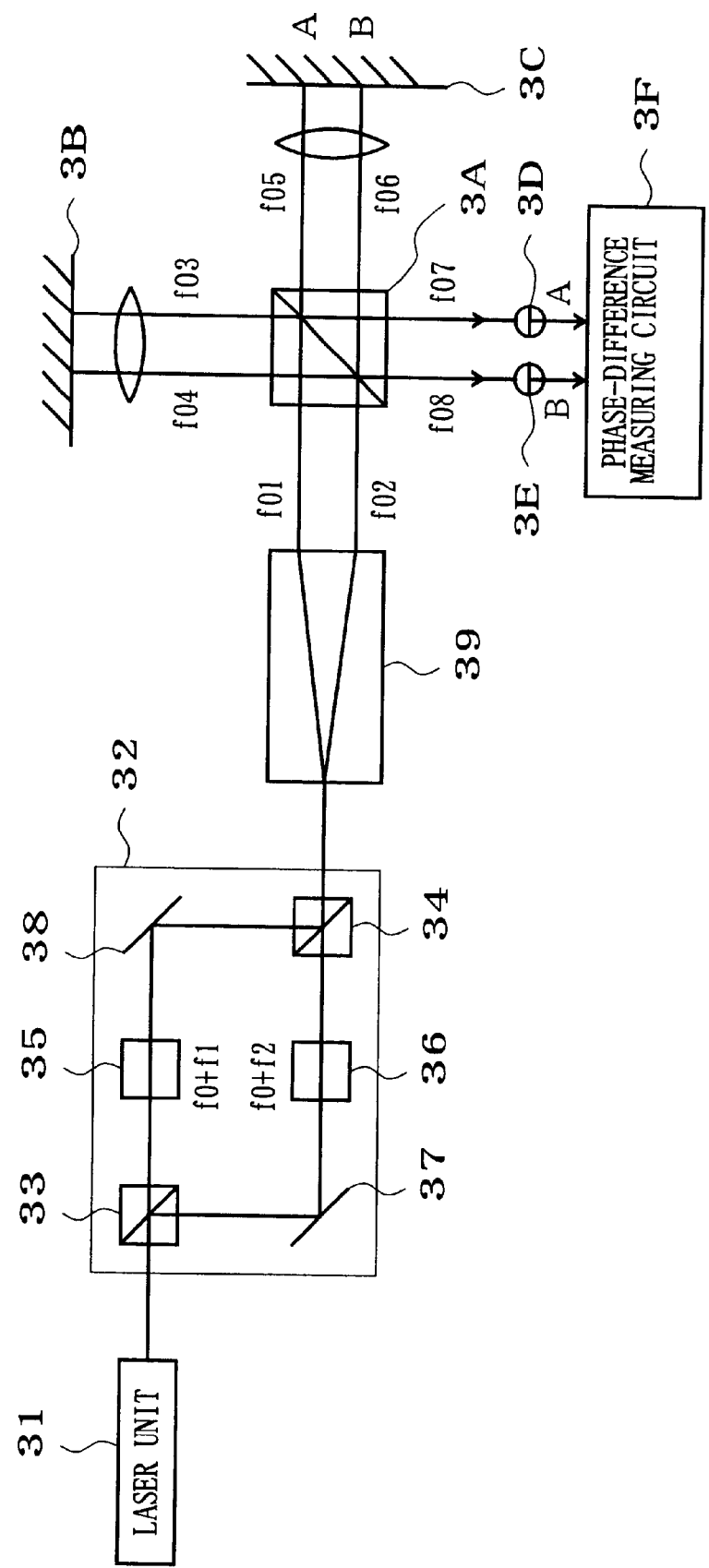
FIG. 1 is a block diagram schematically showing an exemplary organization of an optical glide tester comprising an interferometer based on the interference-phase detecting principle.

FIG. 1 is a block diagram schematically showing an exemplary organization of an optical glide tester employing the interference-phase detecting principle. Structurally, this optical glide tester is based on component parts of an interferometer. Laser unit 31 emits laser light f0 having a 532 nm wavelength, and the emitted laser light f0 is then modulated by a modulator unit 32. The modulator unit 32 includes beam splitters 33, 34, acousto-optic modulators 35, 36 often abbreviated "AOMs" and reflector mirrors 37, 38. The laser light f0 emitted from the laser unit 31 is first divided by the beam splitter 33 into a first laser light beam f0 reflected by the splitter 33 and a second laser light beam f0 transmitted through the splitter 33. The second or transmitted laser light beam f0 is received by the acousto-optic modulator 35, which modulates the frequency f1 of the light beam f0 to thereby provide a frequency-modulated laser light beam f0+f1. The first or reflected laser light beam f0 is further reflected by the reflector mirror 37 to enter the acousto-optic modulator 36, which modulates the frequency f2 of the light beam f0 to thereby provide a frequency-modulated laser light beam f0+f2. The laser light beam f0+f1 from the acousto-optic modulator 35 is directed to the beam splitter 34 via the reflector mirror 38, and similarly the laser light beam f0+f2 from the acousto-optic modulator 36 is sent to the beam splitter 34. The two laser light beams f0+f1 and f0+f2 thus received by the beam splitter 34 are combined together and then passed to a light divider unit 39.

The light divider unit 39 divides the composite laser light beam into two laser light beams f01 and f02 that have a same travelling direction and optical length but are spaced apart from each other by a predetermined distance, and the divider unit 39 gives these divided laser light beams f01 and f02 to a polarizing beam splitter 3A. The polarizing beam splitter 3A reflects part of the two laser light beams (i.e., light components linearly polarized in a predetermined direction) so as to irradiate the linearly polarized laser light beams f03 and f04 onto a reference surface 3B, and allows the remaining laser light (i.e., light components linearly polarized in another direction orthogonal to the laser light beams f03 and f04) to be transmitted therethrough, so as to irradiate the linearly polarized laser light beams f05 and f06 onto separate points A and B, respectively, on a test surface 3C. Although not shown, two wave plates are positioned, between the reference surface 3B and the polarizing beam splitter 3A and between the test surface 3C and the polarizing beam splitter 3A, for converting the respective linearly polarized lights into circularly polarized lights. The laser light beams f03 and f04 reflected off the reference surface 3B are transmitted back through the polarizing beam splitter 3A to enter light-receiving elements 3D and 3E, respectively, because these light beams have now been converted into circularly polarized lights via the corresponding wave plate. Similarly, the laser light beams f05 and f06 reflected off the test surface 3C, which have now been converted into circularly polarized lights via the corresponding wave plate, are reflected by the polarizing beam splitter 3A to enter the light-receiving elements 3D and 3E, respectively.

The light-receiving elements 3D and 3E receive combinations f07 and f08 of the laser light beams f03, f04 reflected off the reference surface 3B and the laser light beams f05, f06 reflected off the test surface 3C, and then supplies a phase-difference measuring circuit 3F with electric signals corresponding to the received composite laser lights f07 and f08. On the basis of the electric signals output from the light-receiving elements 3D and 3E, the phase-difference measuring circuit 3F measures a height of a projection or or depth of a depression in the test surface 3C. The reference surface 3B is, for example, the surface of a reflector mirror disposed at a predetermined position within the interferometer, and the distance between the polarizing beam splitter 3A and the reference surface 3B is kept constant. The test surface 3C, on the other hand, is the surface of an object (e.g., a magnetic disk) to be measured that is placed outside the interferometer. Basically, when microscopic asperities on the surface of the test object are to be measured as in the case of a surface defect inspection of a magnetic disk, the test object, i.e., test surface 3C, is first placed at a predetermined distance from the interferometer and the test surface 3C is scanned with the laser light beams f05 and f06 by moving the test object, i.e., test surface 3C, relative to the interferometer while maintaining the predetermined distance therebetween. Consequently, the distance between the polarizing beam splitter 3A and the test surface 3C slightly varies due to presence of microscopic asperities on the test surface 3C, which brings about interference in the combined light f07 (f08) that is based on the reflected light beam f03 (f04) from the reference surface 3B and the reflected light beam f05 (f06) from the test surface 3C. By measuring the thus-caused interference, it is possible to determine presence/absence of surface defects on the test surface 3C.

Figure 2A:
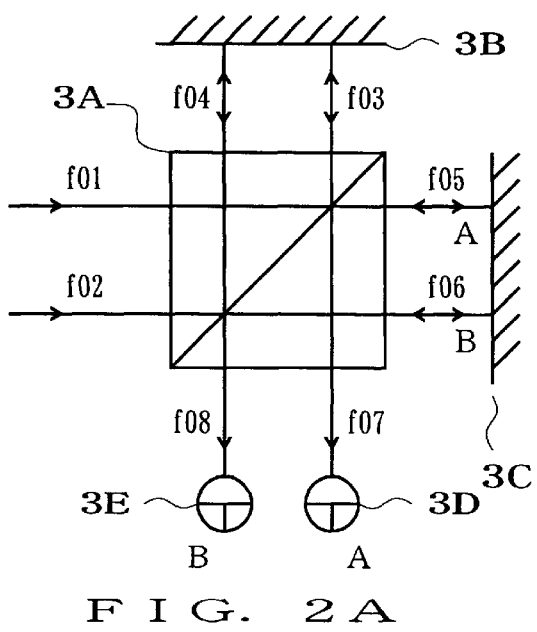
FIGS. 2A and 2B are diagrams explanatory of principles by which interference detection is made by the interferometer of FIG. 1 in a case where there is no projection, stepped region or the like on a test surface.
Figure 2B:
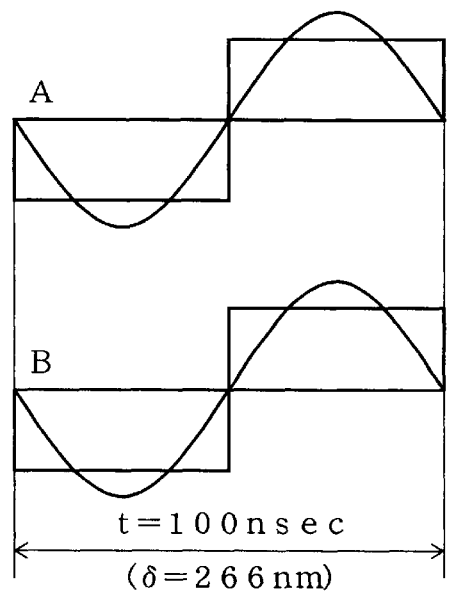
Figure 3A:
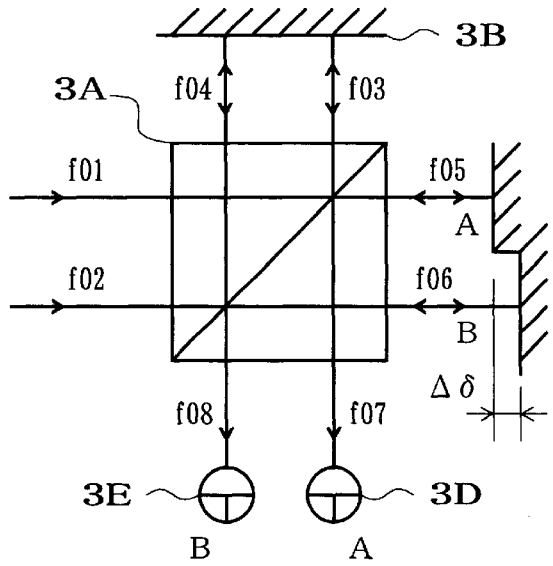
FIGS. 3A and 3B are diagrams explanatory of principles by which interference detection is made by the interferometer of FIG. 1 in a case where there is a projection, stepped region or the like on the test surface.
Figure 3B:
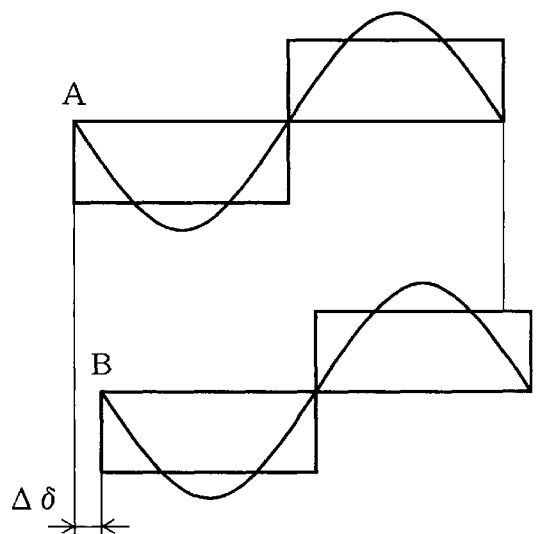
Figure 3B:

FIGS. 2A and 2B and 3A and 3B are diagrams explanatory of basic principles by which the interferometer makes interference detection on the test surface 3C. More specifically, FIG. 2A shows a case where there is no projection, stepped region on the test surface 3C, and FIG. 3A shows another case where the test surface 3C has a projection with height $\Delta\delta$. In FIGS. 2A and 3A, there are only shown the polarizing beam splitter 3A, reference surface 3B, test surface 3C and light-receiving elements 3D and 3E of FIG. 1. In response to reception of the laser lights f07 and f08, the light-receiving elements 3D and 3E output electric signals, as shown in FIGS. 2B and 3B, which correspond to the situations of FIGS. 2A and 3A. Laser light of a 532 nm wavelength emitted from the laser unit 31 is modulated by the modulator unit 32 in such a way that a frequency difference of about 10 MHz is produced between successive modulated frequencies; for example, if one modulated frequency f1 is 150 MHz, then a modulated frequency f2 is 140 MHz. Because of this frequency modulation by the modulator unit 32, the light-receiving elements 3D and 3E will each generate an interference output signal having a 10 MHz frequency (100 nsec period). Because one cycle of the interference output signal corresponds to about one half of the laser light wavelength, i.e., 266 nm, the levels of points A and B on the test surface—if these points are located on a projection, the height of that projection, if these points are located in a depression, the depth of that depression, or if these points form a stepped region, the level difference between the two points—can be determined by measuring a phase difference between the respective interference output signals from the light-receiving elements 3D and 3E.

Interference occurs in one of the composite laser light f07 as follows. As the distance from the beam splitter 3A to the test surface 3C is varied while the distance between the polarizing beam splitter 3A and the reference surface 3B is kept constant, the phase of the laser light beam f05 reflected off the test surface 3C shifts relative to that of the laser light beam f03 reflected off the reference surface 3B depending on the varied distance to the surface 3C, so that optical interference corresponding to the varied distance to the test surface 3C occurs in the composite laser light f07 made up of these reflected lights f03 and f05 and the phase of the interference light f07 shifts in accordance with the distance to the test surface 3C. Similarly, as a result of combination between the laser light beam f04 reflected off the reference surface 3B and the laser light beam f06 reflected off the test surface 3C, optical interference corresponding to the varied distance to the test surface 3C occurs in the composite laser light f08 and the phase of the interference light f08 shifts in accordance with the distance to the test surface 3C. The interference phase of the interference light f07 can be detected by detecting the phase shift of the interference light f08 relative to a predetermined reference phase which, in the illustrated example, is the phase of the reflected laser light beam f03 from the reference 3B. The interference phase of the light f08 can be detected in a similar manner. Note that the reference phase for use in detecting the interference phase may either be an absolute phase like that of the laser light beam f03 or be a relative phase. The reason why two interference lights f07 and f08 are produced, in the illustrated example of FIG. 1, by irradiating two laser light beams f05 and f06 onto two points A and B of the test surface 3C is to allow the level difference between the two points A and B to be determined promptly at a stroke by just measuring one of the two interference lights f08 or f07 using the other interference light f07 or f08 as the relative reference phase.

In the example shown in FIGS. 2A and 2B where no projection or stepped region is present on the test surface 3C, the light beams reflected from points A and B of the surface 3C go back along the same optical paths to enter the light-receiving elements 3D and 3E, respectively. Therefore, the interference output signals from these light-receiving elements 3D and 3E are kept in phase with each other. On the other hand, in the example shown in FIGS. 3A and 3B where a stepped region is present on the test surface 3C, a phase difference $\Delta t$ corresponding to the level difference $\Delta\delta$ occurs between the interference output signals from the light-receiving elements 3D and 3E as shown; this phase difference $\Delta t$ corresponds to the level difference between points A and B of the surface 3C. This means that the level difference $\Delta\delta$ can be determined by measuring the phase difference $\Delta t$. For example, the phase difference $\Delta t$ may be measured by detecting a predetermined phase (typically, a zero-cross phase representing the amplitude level center between positive and negative swings) of the interference output signal for the laser light f07 associated with point A to generate a phase detection pulse PA representative of the thus-detected phase and a predetermined phase (zero-cross phase) of the interference output signal for the laser light f08 associated with point B to generate a phase detection pulse PB representative of the thus-detected phase, and then calculating a time difference between the two pulses PA and PB.

Typically, in detecting the predetermined phase (e.g., zero-cross phase) of each of the interference output signals, a given phase detection pulse may be provided by a comparator making a comparison with a predetermined slice voltage (comparison reference voltage) and outputting a pulse once the level of the interference output signal coincides with the slice voltage (comparison reference voltage). In such a case, it is necessary to vary the predetermined slice voltage (comparison reference voltage) in response to variation in the amplitude center level of the interference output signal and constantly generate a phase detection pulse corresponding to the amplitude center level, i.e., zero-cross phase, of the interference output signal. As an example, this goal may be accomplished by passing the interference output signals from the light-receiving elements 3D and 3E through a low-pass filter to produce voltage that varies in accordance with the amplitude center level of the interference output signal and using the produced voltage as the slice voltage comparison reference voltage. However, such low-pass filtering can almost never effectively follow rapid variation in the amplitude center level of the interference output signal and thus tends to invite interference phase measurement errors.

In the case where the test surface 3C is scanned for microscopic surface asperities using the interferometer while keeping constant the distance between the interferometer and the surface 3C, variation in the reflectivity of the test surface 3C would become a major cause of great amplitude variation in the interference output signals. Even in a situation where the test surface 3C is formed of a uniform material, the surface reflectivity would vary substantially depending on the presence, size, extent, etc. of foreign matters on the surface 3C. Particularly, where a disk surface is scanned with the interferometer while the disk is being rotated at high speed, the reflectivity of the disk surface acting on the interferometer is very likely to change rapidly. Consequently, the slice voltage generation through the lowpass filtering can almost never effectively follow rapid amplitude changes of the interference output signal, and thus would present the problem that the surface defects can not be measured with sufficient accuracy.

Figure 4:
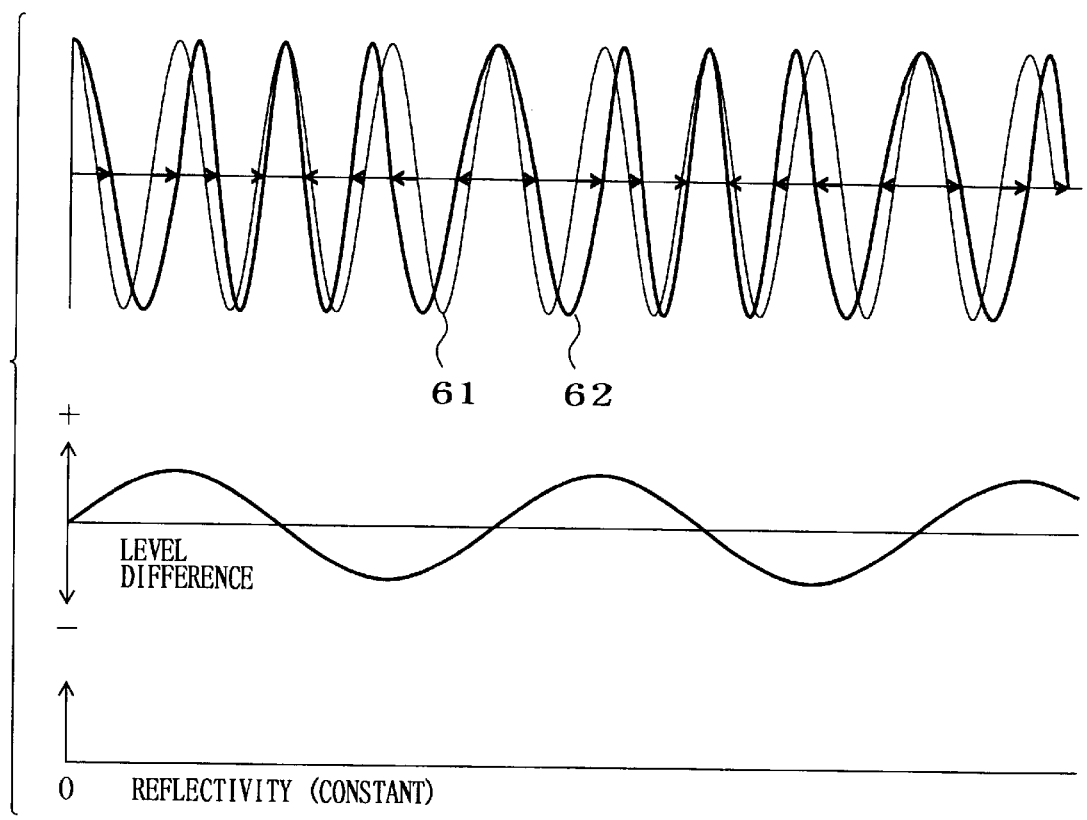
FIG. 4 is a diagram showing interference output signals generated by light-receiving elements of FIG. 1 in a situation where reflectivity of the test surface is constant while a level difference in a stepped region varies.
Figure 5:
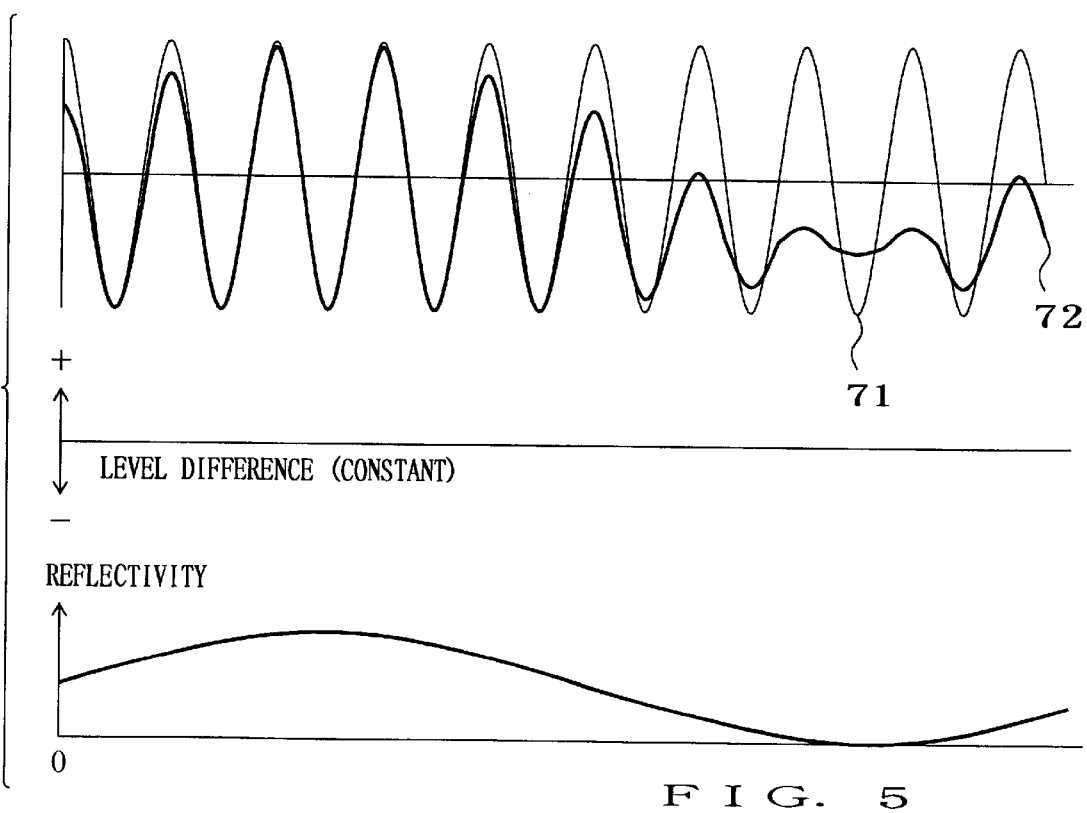
FIG. 5 is a diagram showing interference output signals generated by the light-receiving elements of FIG. 1 in a situation where a level difference in a stepped region is constant while the reflectivity of the test surface varies.

Further explanation of the foregoing is given below with reference to FIGS. 4 and 5. FIG. 4 shows interference output signals generated by the light-receiving elements 3D and 3E in the case where the reflectivity of the test surface 3C is constant and a level difference in a stepped region of the test surface 3C varies, for example, in a sinusoidal fashion. FIG. 5, on the other hand, shows interference output signals generated by the light-receiving elements 3D and 3E in the case where a level difference in a stepped region is constant and the reflectivity of the test surface 3C varies, for example, in a sinusoidal fashion. In these figures, reference numerals 61 and 71 each denote an interference output signal that is generated from the light-receiving element 3D with respect to point A, and reference numerals 62 and 72 each denote an interference output signal that is generated from the light-receiving element 3E with respect to point B. Note that these figures show examples where only the level of point B on the test surface 3C (i.e., distance from the polarizing beam splitter 3A) varies with the level of point A (i.e., distance from the polarizing beam splitter 3A) fixed. With the level difference in the stepped region varying in a sinusoidal fashion, the phase of the interference output signal 62 for point B leads or lags behind that of the interference output signal 61 for point A. In the example of FIG. 4, where the reflectivity of the test surface 3C is constant, no variation occurs in the amplitude center level of the interference output signals and thus the slice voltage for detection of a predetermined phase is kept constant, so that it is possible to measure a phase difference between the interference output signals 61 and 62, i.e., level difference in the stepped region, in a stable manner. However, even where the level difference in the stepped region is constant, variation in the surface reflectivity will lead to attenuation (or increase) in the amplitude center level of the interference output signal 72 for point B, as shown in FIG. 5; if such a level change is at high speed, the low-pass filtering operation for generating the slice voltage intended for detection of a predetermined slice voltage will not be able to properly follow the change.

Figure 6:
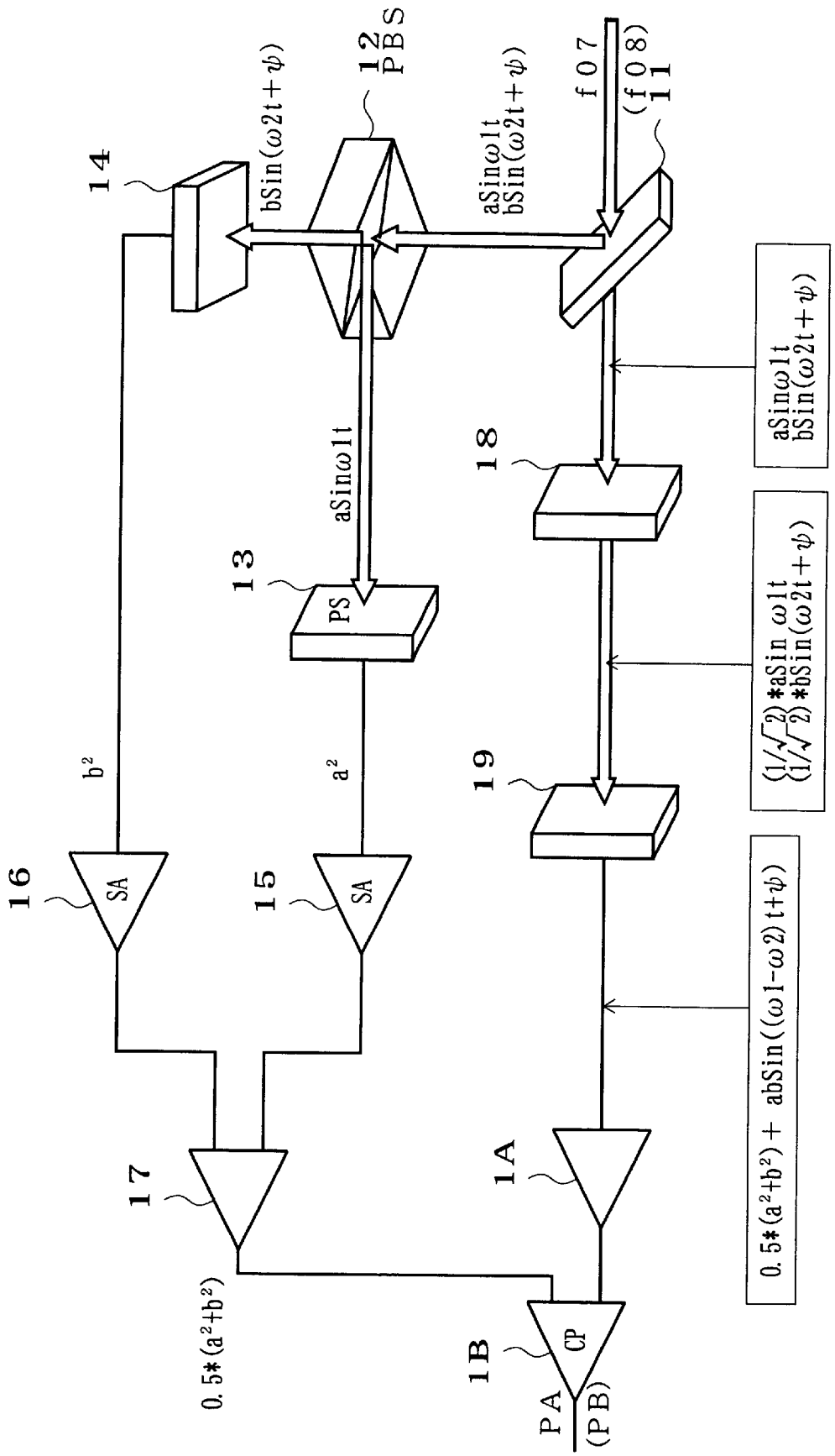
FIG. 6 is an optical and electrical system view outlining an arrangement of a first embodiment of an interference-phase detecting technique for use in an interferometer in accordance with the present invention.
Figure 7:
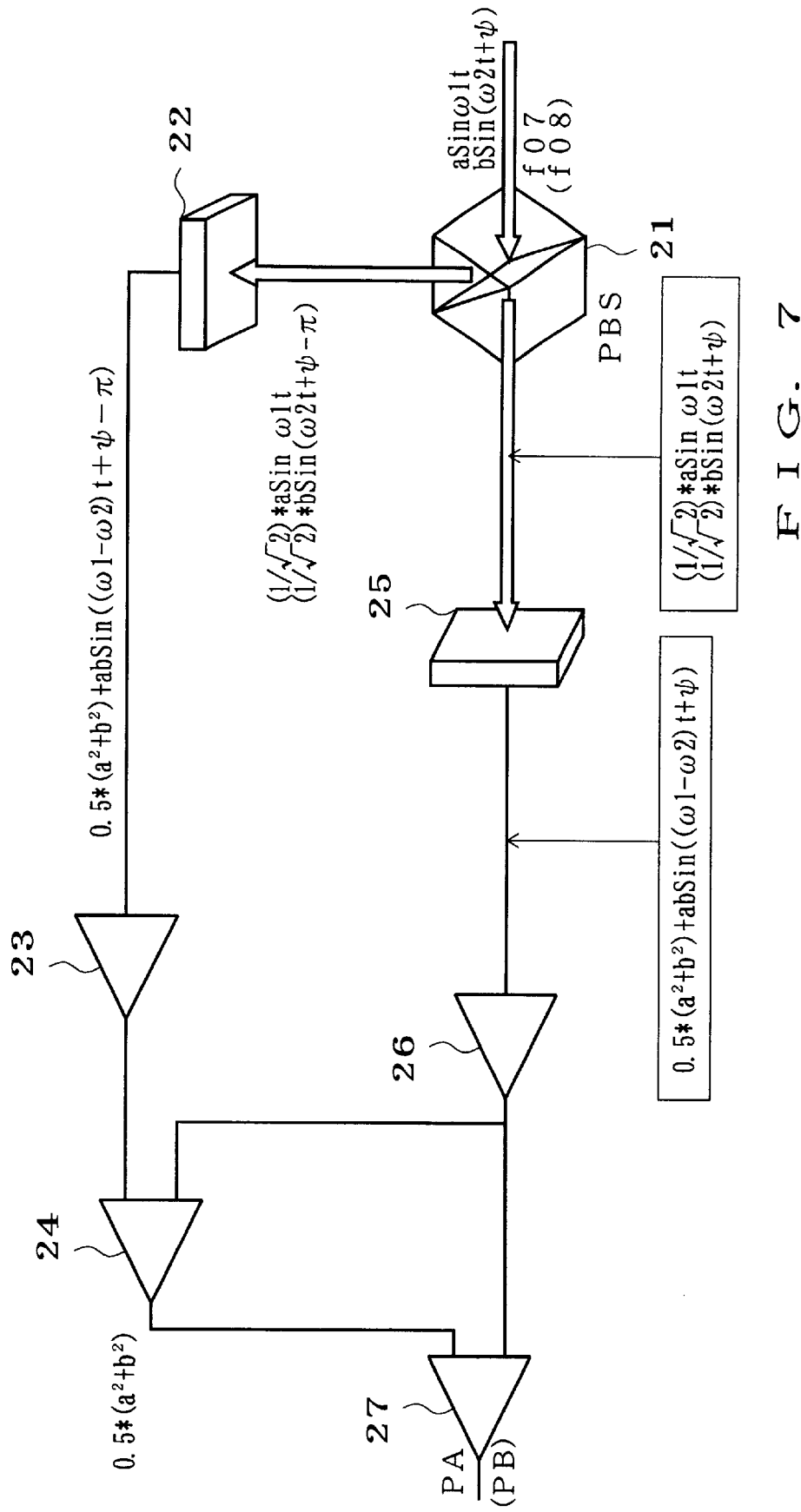
FIG. 7 is an optical and electrical system view outlining an arrangement of a second embodiment of the interference-phase detecting technique of the present invention.
Figure 8:
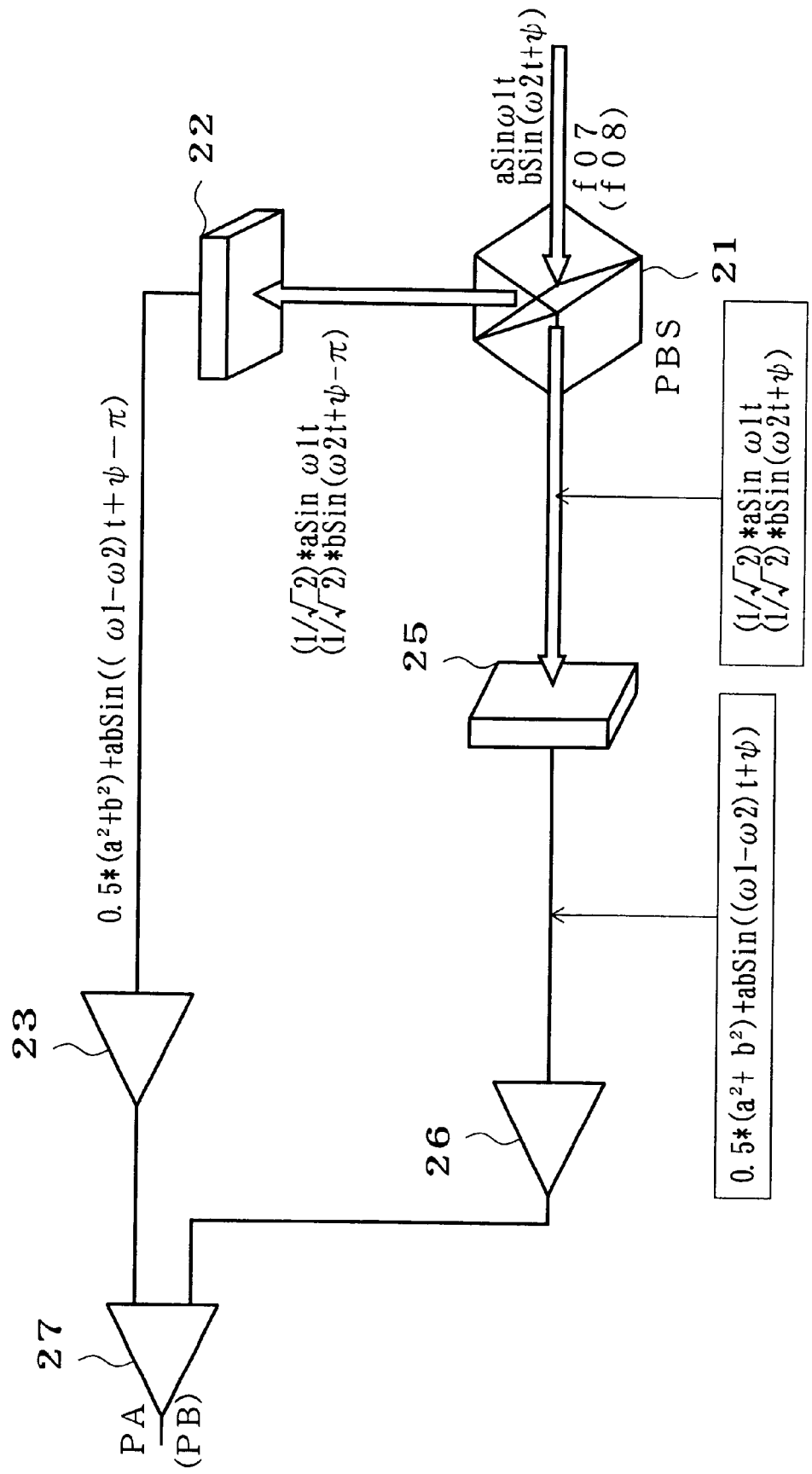
FIG. 8 is an optical and electrical system view outlining an arrangement of a third embodiment of the interference-phase detecting technique of the present invention.

The interference-phase detecting technique for use in an interferometer, proposed by the present invention with reference to FIGS. 6 to 8, provides a solution to the above-discussed problem by permitting accurate detection of a predetermined phase (typically, a zero-cross or amplitude center phase) of the interference output signals without using the low-pass filtering operation as noted above.

FIG. 6 is an optical and electrical system view outlining an arrangement of a first embodiment of the interference-phase detecting technique for use in an interferometer; more specifically, FIG. 6 illustrates an organization for detecting an interference phase of interference light (e.g., interference light f07 of FIG. 1). Assuming that the organization of FIG. 6 operates to detect a phase of the interference light f07 of FIG. 1, this organization may replace the light-receiving element 3D of FIG. 1 and part of the phase-difference measuring circuit 3F associated therewith. Namely, the optical components 11–14, 18 and 19 of FIG. 6 correspond to the light-receiving element 3D shown in FIG. 1, and the electric components 15–17, 1A and 1B of FIG. 6 correspond to some components (those for processing the output signal from the light-receiving element 3D) of the phase-difference measuring circuit 3F shown in FIG. 1. Further, assuming that the organization of FIG. 6 operates to detect a phase of the other interference light f08 of FIG. 1, this organization may replace with the light-receiving element 3E of FIG. 1 and part of the phase-difference measuring circuit 3F associated therewith. Namely, the optical components 11–14, 18 and 19 of FIG. 6 correspond to the light-receiving element 3E shown in FIG. 1, and the electric components 15–17, 1A and 1B of FIG. 6 correspond to some components (those for processing the output signal from the light-receiving element 3E) of the phase-difference measuring circuit 3F shown in FIG. 1.

First, the interference-phase detecting technique will be described below in relation to the case where the arrangement of FIG. 6 processes the interference light f07. First, the laser light f07 from the polarizing beam splitter 3A (FIG. 1) is divided by a half mirror 11 into two light waves, which are directed to a polarizing plate 18 and a polarizing beam splitter 12, respectively. Here, the laser light f07 is an interference wave caused by a laser light "a Sin $\omega_1 t$" reflected off the reference surface 3B (FIG. 1) and a laser light "b Sin($\omega_2 t+\psi$)" reflected off the test surface 3C (FIG. 1), and the respective polarization planes of these laser lights "a Sin $\omega_1 t$" and "b Sin($\omega_2 t+\psi$)" lie orthogonally to each other. Here, the prefix "a" denotes the reflectivity of the reference surface 3B, while the prefix "b" denotes the reflectivity of the test surface 3C. Thus, if the two reflectivities a and b are equal to each other, a waveform will result as exemplified at 61 or 62 in FIG. 4 (i.e., a waveform with no amplitude center level variation); however, if the two reflectivities a and b are different from each other, a waveform will result as exemplified at 72 in FIG. 5 (i.e., a waveform with amplitude center level variation). Accordingly, the laser lights "a Sin ω1t" and "b Sin(ω2t+ψ)" reflected by the half mirror 11 are separated from each other upon incidence on the orthogonal axes of the polarizing beam splitter 12. Specifically, the laser light "a Sin ω1t" is reflected by the polarizing beam splitter 12 to be directed into a photo sensor 13, while the other laser light "b Sin(ω2t+ψ)" passes through the polarizing beam splitter 12 to be directed into another photo sensor 14.

The photo sensor 13 supplies a sensor amplifier 15 with a signal $a^2$ that is indicative of the intensity of the received laser light "a Sin ω1t". Similarly, the photo sensor 14 supplies a sensor amplifier 16 with a signal $b^2$ that is indicative of the intensity of the received laser light "b Sin(ω2t+ψ)". One-half adding amplifier (namely, an averaging device) 17 adds together the light intensity signals $a^2$ and $b^2$ from the sensor amplifiers 15 and 16 and multiples the sum by 0.5, to thereby provide a signal, indicative of the calculated result of $0.5*(a^2+b^2)$, to one input terminal of a comparator 1B. The output signal from the one-half adding amplifier 17 is used as a slice voltage (i.e., a comparison reference voltage to be used for detection of a predetermined phase).

On the other hand, the interference wave caused by the laser lights "a Sin ω1t" and "b Sin(ω2t+ψ)", having passed through the half mirror 11, enters the polarizing plate 18 at an angle of 45° relative to the transmission axis thereof, so that the laser light "a Sin ω1t" becomes (½)*a Sin ω1t and the laser light "b Sin(ω2t+ψ)" becomes (½)*b Sin(ω2t+ψ). The laser light beams "(½)*a Sinω1t" and "(½)*b Sin(ω2t+ψ)", transmitted through the polarizing plate 18, enter a photo sensor 19, in response to which the photo sensor 19 supplies a sensor amplifier 1A with an electric signal indicative of the intensity of the incident laser lights, i.e., an interference output signal, that can be expressed as $0.5*(a^2+b^2)+ab \sin((ω1-ω2)t+ψ)$. The comparator 1B compares the interference output signal "$0.5*(a^2+b^2)+ab \sin((ω1-ω2)t+ψ)$" from the sensor amplifier 1A with the slice voltage "$0.5*(a^2+b^2)$" supplied from the one-half adding amplifier 17. At a time point when the interference output signal from the sensor amplifier 1A has matched the output from the one-half adding amplifier 17 (or when the interference output signal from the sensor amplifier 1A has become greater or smaller than the output from the one-half adding amplifier 17), i.e., when a condition of "Sin{(ω1−ω2)t+ψ}= 0" has been met, an accurate zero-cross detection signal is output from the comparator 1B. Because the output from the one-half adding amplifier 17 can indicate an accurate amplitude center level of the interference output signal even when the reflectivity of the test surface 3C is changing, it can be an ideal slice signal (i.e., reference signal for zero-cross detection).

In this way, a phase detection pulse PA can be obtained which is exactly synchronous with a predetermined phase (zero phase) of the interference output signal for point A. Likewise, by processing the other interference light f08 with the arrangement of FIG. 6, it is possible to obtain a phase detection pulse PB which is exactly synchronous with a predetermined phase (zero phase) of the interference output signal for point B. Thus, by evaluating a time difference Δt between these two phase detection pulses PA and PB, it is possible to determine a phase difference between the two interference lights f07 and f08, so that such a detection exactly reflecting only the level difference between points A and B on the test surface 3C can be performed properly while effectively excluding the influence of the reflectivity variation of the surface 3C.

Next, modifications of the arrangement of FIG. 6 will be described with reference to FIGS. 7 and 8, of which FIG. 7 is an optical and electrical system view outlining an arrangement of a second embodiment of the interference-phase detecting technique of the present invention. More specifically, FIG. 7 illustrates an organization for detecting an interference phase of one of the interference lights (e.g., interference light f07 of FIG. 1) to output a phase detection pulse (e.g., pulse PA) corresponding to the detected phase. Such a phase detection can be made of the other interference light (f08) by application of the arrangement of FIG. 7. Whereas three photo sensors 13, 14 and 19 are used in the above-described embodiment of FIG. 6, the embodiment of FIG. 7 requires only two photo sensors 22 and 25 and thus is substantially simplified in structure.

First, the laser light f07 from the polarizing beam splitter 3A is introduced into a further polarizing beam splitter 21 at an angle of 45° relative to its orthogonal axes, so that the laser light "a Sin ω1t" reflected off the reference surface 3B and the laser light "b Sin(ω2t+ψ)" reflected off the test surface 3C are divided into transmitted and reflected light beams of halved output power. Of the reflected light beams, only the laser light beams "b Sin(ω2t+ψ)" reflected off the test surface 3C has a waveform phase-shifted by 180° as expressed by "(½)*b Sin(ω2t+ψ−π)". As a consequence, the transmitted light beam through the polarizing beam splitter 21 has a composite waveform of (½)*a Sin ω1t and (½)*b Sin(ω2t+ψ), and the reflected light beam from the polarizing beam splitter 21 has a composite waveform of (½)*a Sin ω1t and (½)*b Sin(ω2t+ψ−π).

The photo sensor 22 outputs, to a sensor amplifier 23, an interference output signal "$0.5*(a^2+b^2)+ab \sin\{(ω1-ω2)t+ψ-π\}$" caused by the reflected light beams "(½)*a Sin ω1t" and "(½)*b Sin(ω2t+ψ−π)". Similarly, the photo sensor 25 outputs, to a sensor amplifier 26, an interference output signal "$0.5*(a^2+b^2)+ab \sin\{(ω1-ψ2)t+ψ\}$" caused by the transmitted light beams "(½)*a Sin ω1t" and "(½)*b Sin (ω2t+ψ)". One-half adding amplifier 24 adds together the interference output signals from the sensor amplifiers 23 and 26 and multiplies the sum by 0.5, to thereby provide the calculated result as a slice voltage value "$0.5*(a^2+b^2)$" to one input terminal of a comparator 27. In the meantime, the interference output signal "$0.5*(a^2+b^2)+ab \sin((ω1-ω2)t+ψ)$" from the sensor amplifier 26 is sent directly to another input terminal of the comparator 27. Thus, the comparator 27 compares the interference output signal "$0.5*(a^2+b^2)+ab \sin\{(ω1-ω2)t+ψ\}$" from the sensor amplifier 26 with the slice voltage "$0.5*(a^2+b^2)$" from the one-half adding amplifier 24. At a time point when the interference output signal from the sensor amplifier 26 has matched the output from the one-half adding amplifier 24 (or alternatively, at a time point when the interference output signal has become greater or smaller than the output from the one-half adding amplifier 24), i.e., when a condition of "Sin{(ω1−ω2)t+ψ}=0" has been met, a zero-cross detection signal is output from the comparator 27. Because the output from the one-half adding amplifier 17 can indicate an accurate amplitude center level of the interference output signal even when the reflectivity of the test surface 3C is changing, it can be an ideal slice signal. In this way, a phase detection pulse PA can be obtained which is exactly synchronous with a predetermined phase (zero phase) of the interference output signal for point A. Likewise, by processing the other interference light f08 with the arrangement of FIG. 7, it is possible to obtain a phase detection pulse PB which is exactly synchronous with a predetermined phase (zero phase) of the interference output signal for point B.

Further, FIG. 8 is an optical and electrical system view outlining an arrangement of a third embodiment of the interference-phase detecting technique in accordance with the present invention. The interference-phase detecting techniques of FIGS. 6 and 7 have been described as generating a slice signal and detecting an amplitude center level of the interference output signal on the basis of the slice signal. The third embodiment, however, is characterized by detecting an amplitude center level of the interference output signal without having to generate a slice signal. More specifically, the interference-phase detecting technique for use in an interferometer in accordance with the third embodiment is generally similar in structure to the embodiment of FIG. 7 but different therefrom in that the comparator 27 directly compares the interference output signals from the sensor amplifiers 23 and 26, without intervention of the one-half adding amplifier 24 of FIG. 7, to thereby output a phase detection signal. The comparator 27 compares the interference output signal "$0.5*(a^2+b^2)+ab \, \text{Sin}\{(\omega 1 - \omega 2)t + \psi - \pi\}$" from the sensor amplifier 23 and the interference output signal "$0.5*(a^2+b^2)+ab \, \text{Sin}\{(\omega 1 - \omega 2)t + \psi\}$" from the sensor amplifier 26. At a time point when the two interference output signals from the sensor amplifiers 23 and 26 have matched each other (or alternatively, at a time point when the latter interference output signal has become greater or smaller than the former), a zero-cross detection signal is output from the comparator 27. Because the interference output signals from the sensor amplifiers 23 and 26 have a same amplitude center level (i.e., $(a^2+b^2)/2$) but are phase-shifted from each other by 180°, the time point when the two interference output signals from the sensor amplifiers 23 and 26 have matched each other represents an amplitude center (i.e., zero-cross) of the interference output signal. For this reason, the amplitude center level of the interference output signal can be detected accurately even when the reflectivity of the test surface 3C is changing, similarly to the embodiments of FIGS. 6 and 7. Note that conversion coefficients of the photo sensors and sensor amplifiers in FIGS. 6, 7 and 8 are omitted just for convenience of illustration.

The interference phase detecting techniques of FIGS. 6, 7 and 8 have been described above as being applied to an interferometer that deals with two separate interference lights f07 and f08; alternatively, they may be applied to another type of interferometer dealing with a single interference light. In such an alternative, measurement may be made of a time or phase difference of a phase detection pulse PA, output for that single interference light f07, from a predetermined reference phase such as a zero phase of the interference-free reflected light f03 from the reference surface 3B.

Now, with reference to FIGS. 9 to 11, a description will be made about embodiments of an interference-intensity detecting technique for use an interferometer according to the present invention.

Figure 9:
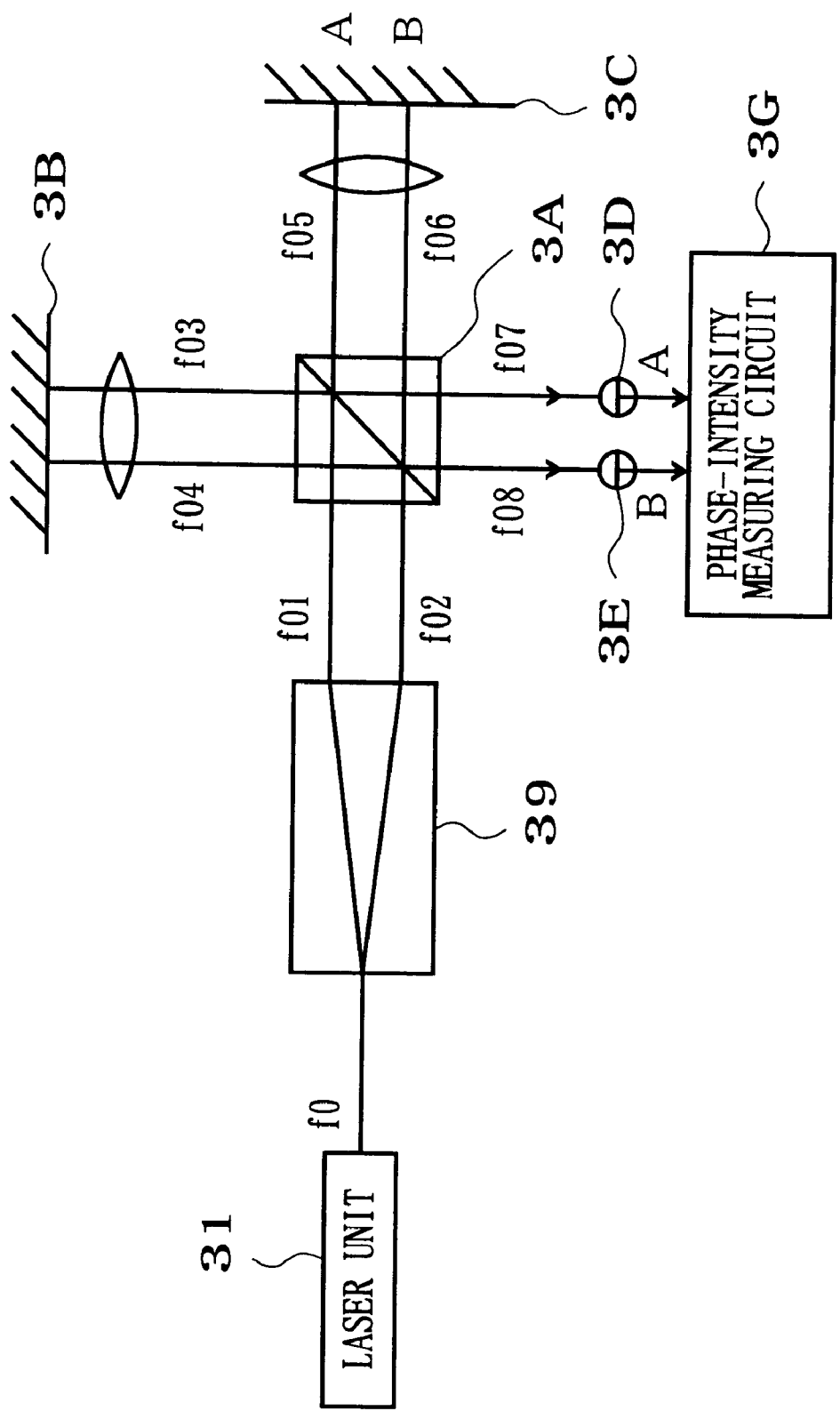
FIG. 9 is a block diagram schematically showing an exemplary organization of an optical glide tester comprising an interferometer based on the interference-intensity detecting principle.

FIG. 9 is a block diagram schematically showing an exemplary organization of an optical glide tester employing the interference-intensity detecting principle. The optical glide tester of FIG. 9 is also based on the component parts of the interferometer, but it dose not include the modulator unit 32 that is provided in the glide tester of FIG. 1. Laser unit 31 emits laser light f0 having a 532 nm wavelength, and the emitted laser light f0 is divided via a divider unit 39 into two laser light beams f01 and f02 that have a same travelling direction and optical length but are spaced apart from each other by a predetermined distance, and the divider unit 39 gives these divided laser light beams f01 and f02 to a polarizing beam splitter 3A. The polarizing beam splitter 3A reflects part of the two laser light beams (i.e., light components f03 and f04 linearly polarized in a predetermined direction) so as to irradiate the linearly polarized laser lights f03 and f04 onto a reference surface 3B, and allows the remaining laser lights (i.e., light components f05 and f06 linearly polarized in another direction orthogonal to the laser lights f03 and f04) to be transmitted therethrough, so as to irradiate the linearly polarized laser lights f05 and f06 onto separate points A and B, respectively, on a test surface 3C. Although not shown, two wave plates are positioned, between the reference surface 3B and the polarizing beam splitter 3A and between the test surface 3C and the polarizing beam splitter 3A, for converting the respective linearly polarized lights into circularly polarized lights. The laser light beams f03 and f04 reflected off the reference surface 3B are transmitted back through the polarizing beam splitter 3A to enter light-receiving elements 3D and 3E, respectively, because these lights have now been converted into circularly polarized lights via the corresponding wave plate. Similarly, the laser light beams f05 and f06 reflected off the test surface 3C, which have now been converted into circularly polarized lights via the corresponding wave plate, are reflected by the polarizing beam splitter 3A to enter the light-receiving elements 3D and 3E, respectively.

The light-receiving elements 3D and 3E receive combinations f07 and f08 of the laser light beams f03, f04 reflected off the reference surface 3B and the laser light beams f05, f06 reflected off the test surface 3C, and supplies a phase-intensity measuring circuit 3G with electric signals corresponding to the received composite laser lights f07 and f08. On the basis of the electric signals from the light-receiving elements 3D and 3E, the phase-intensity measuring circuit 3G measures a height of a projection, depth of a depression or level difference in the test surface 3C.

If the distances between the beam splitter 3A and the reference surface 3B and between the beam splitter 3A and the test surface 3C are equal to each other, then the laser light beam f03 reflected off the reference surface 3B and the laser light beam f05 reflected off the test surface 3C present a same phase, so that the laser light f07, i.e., interference light f07, presents a maximum light intensity and hence a maximum amplitude value of an interference output signal. Conversely, if the distances between the beam splitter 3A and the reference surface 3B and between the beam splitter 3A and the test surface 3C are not equal to each other, then the laser light beam f03 reflected off the reference surface 3B and the laser light beam f05 reflected off the test surface 3C present different phases, so that the intensity of the interference light f07, i.e, the amplitude of the interference output signal, decreases in accordance with the phase difference. Particularly, if the laser light beam f03 reflected off the reference surface 3B and the laser light beam f05 reflected off the test surface 3C are phase-shifted from each other by 180°, the intensity of the interference light f07, i.e, the amplitude of the interference output signal, presents a minimum value. For instance, the amplitude value (light intensity) of the interference light f07 varies in a sine function when both the waveforms of the laser light beams f03 and f05 are within a 0° to 180° phase range. Thus, by measuring respective amplitude values of the interference output signals, i.e., respective interference intensity values, of the two laser lights f07 and f08 and comparing them with a predetermined reference value, the phase-intensity measuring circuit 3G can determine presence or absence of a surface defect at points A and B on the test surface 3C and scale of the defect such as a height or depth of a defective projection or depression if any. Particularly, in this case, where two interference lights f07 and f08 are used, presence or absence of a level difference between the two points A and B on the test surface 3C, i.e., a height or depth of a projection or depression can be determined by measurement of an interference intensity difference between the two interference lights f07 and f08. Namely, the interference intensity difference between the two interference lights f07 and f08 corresponds to the phase difference between these interference lights f07 and f08.

Measurement of interference intensity can be performed by detecting a peak amplitude value of each wave of the interference output signal, which is, however, not so easy. Thus, one possible alternative for the interference intensity measurement with increased ease is to pass the interference output signal through a low-pass filter. Passing the interference output signal through the low-pass filter can smooth the signal's amplitude, thus making it possible to measure a voltage that reflects a peak amplitude (full-scale voltage) representative of interference intensity. But, such low-pass filtering can almost never effectively follow rapid variation in the amplitude level of the interference output signal and thus tends to invite interference phase measurement errors.

In the case where the test surface 3C is scanned for microscopic surface defects, such as asperities, using the interferometer while keeping constant the distance between the interferometer and the surface 3C, variation in the reflectivity of the test surface 3C would become a major cause of great amplitude variation in the interference output signals, as previously noted. Even in a situation where the test surface 3C is formed of a uniform material, the surface reflectivity would vary substantially depending on the presence, size, extent, etc. of foreign matters on the surface 3C. Particularly, where a disk surface is scanned with an interferometer while the disk is being rotated at high speed, the reflectivity of the disk surface acting on the interferometer is very likely to change rapidly. Consequently, the full-scale voltage (peak-amplitude measurement voltage) generation through the low-pass filtering can almost never effectively follow rapid amplitude changes of the interference output signal, and thus would present the problem that the surface defects can not be measured with sufficient accuracy.

The interference-intensity detecting technique for use in an interferometer, proposed by the present invention with reference to FIGS. 10 and 11 below, provides a solution to the above-discussed problem by permitting accurate detection of interference intensity of the interference output signals without using the low-pass filtering operation as noted above.

Figure 10:
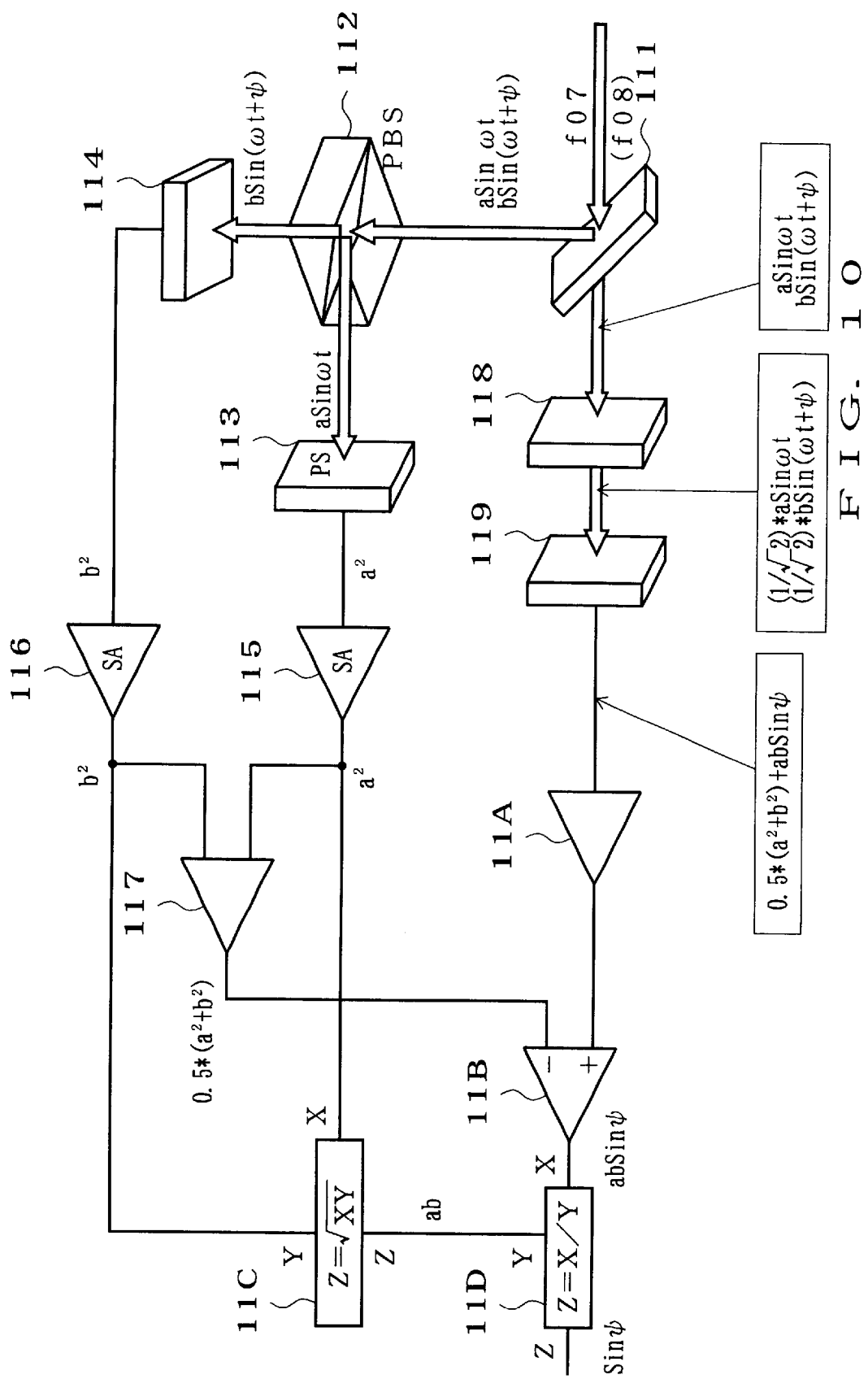
FIG. 10 is an optical and electrical system view outlining an arrangement of a first embodiment of an interference-intensity detecting technique for use in an interferometer in accordance with the present invention.

FIG. 10 is an optical and electrical system view outlining an arrangement of a first embodiment of the interference-intensity detecting technique for use in an interferometer; more specifically, FIG. 10 illustrates an organization for detecting interference intensity of interference light (e.g., the interference light f07 of FIG. 1). Assuming that the organization of FIG. 10 operates to detect intensity of the interference light f07 of FIG. 9, this organization may replace the light-receiving element 3D of FIG. 9 and part of interference-intensity measuring circuit 3G associated therewith. Namely, the optical components 111–114, 118 and 119 of FIG. 10 correspond to the light-receiving element 3D shown in FIG. 9, and the electric components 115–117 and 11A–11D of FIG. 9 correspond to some component parts (those for processing the output signal from the light-receiving element 3D) of the interference-intensity measuring circuit 3G shown in FIG. 9. Further, assuming that the organization of FIG. 9 operates to detect intensity of the other interference light f08 of FIG. 9, this organization may replace the light-receiving element 3E of FIG. 9 and part of the interference-intensity measuring circuit 3G associated therewith. Namely, the optical components 111–114, 118 and 119 of FIG. 9 correspond to the light-receiving element 3E shown in FIG. 9, and the electric components 115–117 and 11A–11D of FIG. 10 correspond to some component parts (those for processing the output from the light-receiving element 3E) of the interference-intensity measuring circuit 3G shown in FIG. 9.

First, the interference-intensity detecting technique will be described below in relation to the case where the arrangement of FIG. 10 processes the interference light f07. First, the laser light f07 from the polarizing beam splitter 3A (FIG. 9) is divided by a half mirror 111 into two light waves, which are then directed to a polarizing plate 118 and a polarizing beam splitter 112, respectively. Here, the laser light f07 is an interference wave caused by a laser light beam "a Sin ωt" reflected off the reference surface 3B (FIG. 1) and a laser light beam "b Sin(ωt+ψ)" reflected off the test surface 3C, and the respective polarization planes of these laser light beams "a Sin ωt" and "b Sin(ωt+ψ)" lie orthogonally to each other. Here, the prefix "a" denotes the reflectivity of the reference surface 3B, while the prefix "b" denotes the reflectivity of the test surface 3C. Whereas the reflectivity of the reference surface 3B is constant, the reflectivity of the test surface 3C varies depending on current conditions of the surface 3C. The laser light beams "a Sin ωt" and "b Sin(ωt+ψ)" reflected by the half mirror 111 are separated from each other upon incidence on the orthogonal axes of the polarizing beam splitter 112. Specifically, the laser light beam "a Sin ωt" is reflected by the polarizing beam splitter 112 to be directed into a photo sensor 113, while the other laser light beam "b Sin(ω+ψ)" passes through the polarizing beam splitter 112 to be directed to another photo sensor 114.

The photo sensor 113 supplies a sensor amplifier 115 with an electric signal $a^2$ that is indicative of the intensity of the received laser light beam "a Sin ωt". Similarly, the photo sensor 114 supplies a sensor amplifier 116 with an electric signal $b^2$ that is indicative of the intensity of the received laser light "b Sin(ωt+ψ)". One-half adding amplifier 117 adds together the light intensity signals $a^2$ and $b^2$ from the sensor amplifiers 115 and 116 and multiples the sum by 0.5, to thereby provide a signal, indicative of the calculated result of $0.5*(a^2+b^2)$, to a minus input terminal of a subtracting amplifier 11B. First arithmetic operator 11C evaluates a square root of a product between the electric signals output from the sensor amplifiers 115 and 116 and passes the thus-evaluated square root to another or second arithmetic operator 11D. Namely, if the light intensity signal $a^2$ from the sensor amplifier 115 is denoted by X and the light intensity signal $b^2$ from the sensor amplifier 116 is denoted by Y, then the output Z from the first arithmetic operator 11C can be expressed as $(XY)^20.5$, namely, $Z=(XY)$. As a consequence, the first arithmetic operator 11C supplies the second arithmetic operator 11D with the product of the reflectivities a and b of the reference and test surfaces 3B and 3C. On the other hand, the interference wave caused by the laser light beams "a Sin ωt" and "b Sin(ωt+ψ)", having passed through the half mirror 111, enters the polarizing plate 118 at an angle of 45° relative to the transmission axis thereof, so that the laser light beam "a Sin ωt" becomes (½)*a Sin ωt and the laser light "b Sin(ωt+ψ)" becomes (½)* b Sin(ωt+ψ). The laser light beams "(½)*a Sin ωt" and "(½)*b Sin(ωt+ψ)", transmitted through the polarizing plate 118, enter a photo sensor 119, in response to which the photo sensor 119 supplies a sensor amplifier 11A with a signal indicative of the intensity of the incident laser light beams, i.e., an interference output signal, that can be expressed as $0.5*(a^2+b^2)+ab \sin \psi$.

The subtracting amplifier 11B subtracts the slice voltage "$0.5*(a^2+b^2)$" provided by the one-half adding amplifier 117 from the interference output signal "$0.5*(a^2+b^2)+ab \sin \psi$" provided by the sensor amplifier 11A, and then supplies the second arithmetic operator 11D with a value obtained by multiplying the subtracted result "ab Sin ψ" by 0.5. The second arithmetic operator 11D divides the output signal "ab Sin ψ" from the subtracting amplifier 11B by the output signal "ab" from the first arithmetic operator 11C and provides a signal "Sin ψ" indicative of the division result. Therefore, the second arithmetic operator 11D provides an ultimate output signal "Sin ψ" that has not been influenced by the reflectivities a and b and assumes an output waveform depending only on a phase difference ψ between the laser light "a Sin ψ" reflected off the reference surface 3B and the laser light "b Sin(ωt+ψ)" reflected off the test surface 3C. Namely, this detecting technique is designed to determine a phase difference ψ between the laser light "a Sin ψ" and the laser light "b Sin(ωt+ψ)", rather than directly measuring interference intensity, to thereby provide a signal indicative of the interference intensity in a sine function Sin ψ corresponding to the phase difference ψ. With this arrangement, it is possible to measure accurate interference intensity that corresponds to presence of a projection or depression at point A on the test surface 3C and its height or depth, irrespective of variation in the reflectivity of the test surface 3C.

Likewise, by processing the other interference light f08 with the arrangement of FIG. 10, it is possible to provide a signal, accurately indicating interference intensity of the interference output signal for point B, that is free of any influence of variation in the reflectivity b and corresponds to presence of a projection or depression at point B on the test surface 3C and its height or depth. Thus, a phase difference between the two interference lights f07 and f08 can be determined on the basis of a difference in interference intensity detection signals for the interference lights f07 and f08, which permits interference intensity detection that exactly reflects only a level difference between points A and B on the test surface 3C while reliably eliminating the influence of variation in the reflectivity of the test surface 3C.

Next, a modification of the arrangement of FIG. 10 will be described with reference to FIG. 11, which is an optical and electrical system view outlining an arrangement of a second embodiment of the interference-intensity detecting technique of the present invention. Whereas three photo sensors are used in the above-described embodiment of FIG. 10, the embodiment of FIG. 11 requires only two photo sensors 122 and 125.

Figure 11:
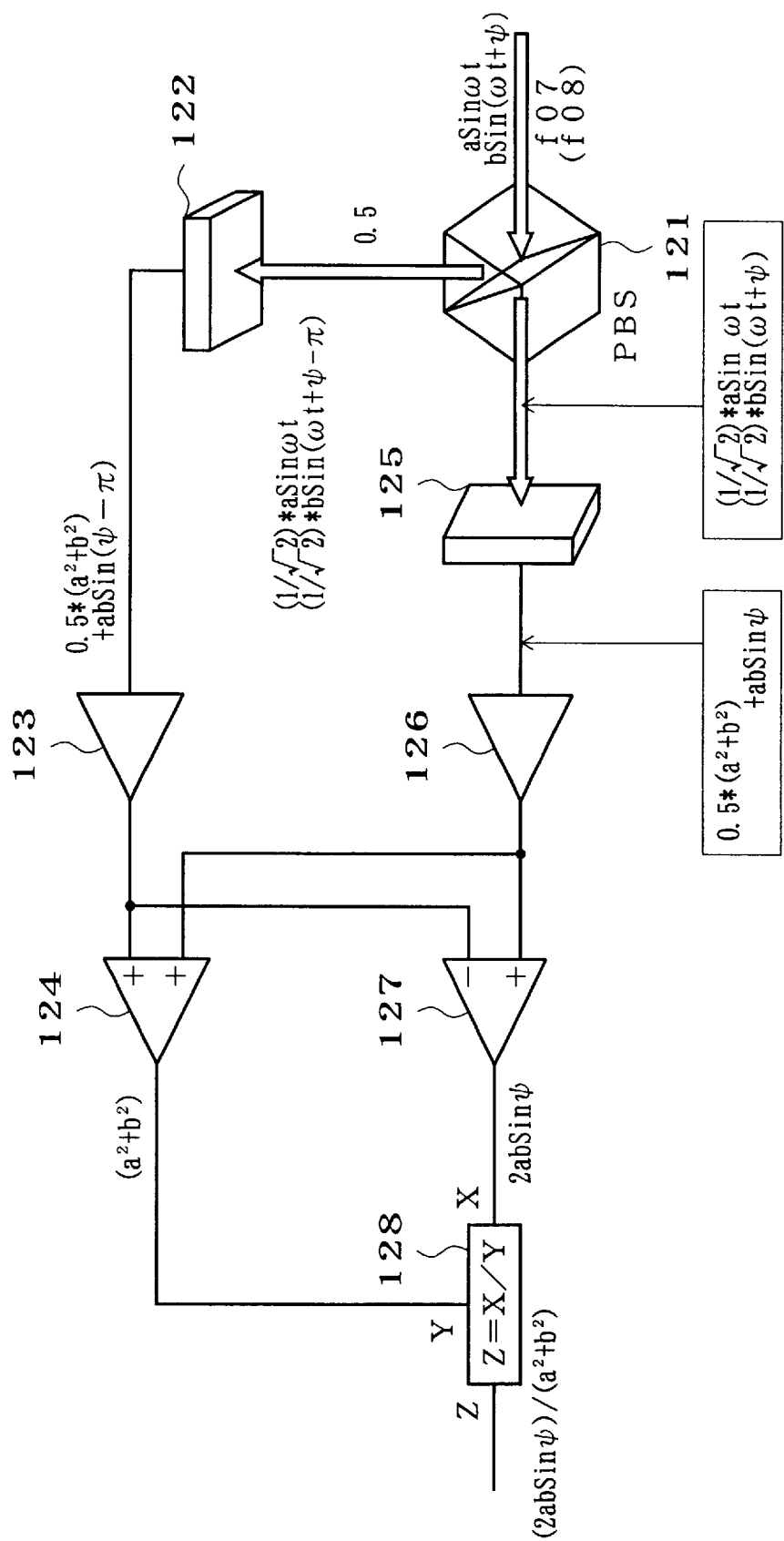
FIG. 11 is an optical and electrical system view outlining an arrangement of a second embodiment of the interference-intensity detecting technique of the present invention.

The following paragraph describes the case where the interference light f07 of FIG. 11 is processed. First, the laser light f07 from the polarizing beam splitter 3A is introduced into a further polarizing beam splitter 121 at an angle of 45° relative to its orthogonal axes, so that the laser light "a Sin ωt" reflected off the reference surface 3B and the laser light b Sin(ωt+ψ) reflected off the test surface 3C are divided into transmitted and reflected light beams having half the initial output power. Of the reflected light, only the laser light "b Sin(ωt+ψ)" reflected off the test surface 3C has a waveform phase-shifted by 180° as expressed by (½)*b Sin(ωt+ψ−π). As a consequence, the transmitted light beam through the polarizing beam splitter 121 has a composite waveform of (½)*a Sin ωt and (½)*b Sin(ωt+ψ), and the reflected light beam from the polarizing beam splitter 121 has a composite waveform of (½)*a Sin ωt and (½)*b Sin(ωt+ψ−π).

The photo sensor 122 outputs, to a sensor amplifier 123, an interference output signal "$0.5*(a^2+b^2)+ab \sin\{(\omega+\psi-\pi\}$" caused by the reflected lights "(½)*a Sin ωt" and "(½)*b Sin(ωt+ψ−π)". Similarly, the photo sensor 125 outputs, to a sensor amplifier 26, an interference output signal "$0.5*(a^2+b^2)+ab \sin \psi$" caused by the transmitted light beams "(½)*a Sin ωt" and "(½)*b Sin(ωt+ψ)". Adding amplifier 124 adds together interference output signals from the above-mentioned sensor amplifiers 123 and 126. Because the signal components applied to two inputs of the adding amplifier 124 are of opposite phase, these applied signal components are cancelled out, so that only components of the reflectivities a and b are output as the addition result of $a^2+b^2$ and given to a divider 128. Subtracting amplifier 127 subtracts the interference output signal "$0.5*(a^2+b^2)+ab \sin(\psi-\pi)$" provided by the sensor amplifier 123 from the interference output signal "$0.5*(a^2+b^2)+ab \sin \psi$" provided by the sensor amplifier 126. Because components of the reflectivities a and b applied to two inputs of the subtracting amplifier 127 are of a same value and thus cancelled out and because the signal components are of opposite phase, only a value "2ab Sin ψ" corresponding to the signal components is given to the divider 128. The divider 128 outputs a value "$(2ab \sin \psi)/(a^2+b^2)$" calculated by dividing the subtraction result "2ab Sin ψ" from the subtracting amplifier 127 by the addition result $(a^2+b^2)$ from the adding amplifier 124. Namely, in this embodiment, the signal "$(2ab \sin \psi)/(a^2+b^2)$" ultimately output from the divider 128 is a product of a sine function Sin ψ depending on the phase difference between the laser light "a Sin ωt" reflected off the reference surface 3B and the the laser light "b Sin(ωt+ψ)" reflected off the test surface 3C, and a coefficient $2ab/(a^2+b^2)$ depending on the reflectivities a and b of the reference and test surfaces 3B and 3C. Because the reflectivity a of the reference surface 3B is constant, only the reflectivity b of the test surface 3C varies to influence the output from the divider 128. However, because the variation of the test surface reflectivity b functions as the above-mentioned coefficient, they would lead to a decrease in error components corresponding to the variation of the reflectivity b. In this manner, even when the reflectivity b of the test surface is varying, it is possible to measure accurate interference intensity that exactly corresponds to a level difference or height or depth of a projection or depression at point B on the test surface 3C, without being influenced by the reflectivity variation. Likewise, by processing the other interference light f08 with the arrangement of FIG. 11, it is possible to provide a signal accurately indicating interference intensity of the interference output signal for point B. Thus, a phase difference between the two interference lights f07 and f08 can be determined on the basis of a difference in interference intensity detection signals for the interference lights f07 and f08, which permits interference intensity detection that exactly reflects only a level difference between points A and B on the test surface 3C while reliably eliminating the influence of the reflectivity variation of the test surface 3C.

Note that conversion coefficients of the photo sensors and sensor amplifiers in FIGS. 10 and 11 are omitted for convenience of illustration.

Whereas the interference phase detecting techniques of FIGS. 10 and 11 have been described above as being applied to an interferometer that deals with two separate interference lights f07 and f08, they may be applied to another type of interferometer dealing with a single interference light.

In summary, the interference-phase and interference-intensity detecting techniques of the present invention, having been described so far, can accurately measure a level difference, height or depth of a projection or depression, etc. on a test surface and hence affords very superior benefits in inspection of surface detects and the like on the test surface.

What is claimed is:

1. An interference detecting system for detecting a phase of interference light occurring between a first laser light of a reference phase and a second laser light of a measuring phase, said interference detecting system comprising:
   a light divider that divides the interference light into two interference light beams to be directed in two directions;
   a polarizing light separator that receives one of the interference light beams from said light divider and separates components of said first and second laser lights from the interference light beam received thereby;
   first and second light detectors that convert respective light energy of the components separated by said polarizing light separator into electric signals;
   an arithmetic operator that performs an arithmetic operation between the electric signals outputted by said first and second light detectors, said arithmetic operation including an average-evaluating operation;
   a third light detector that converts light energy of another of the interference light beams from said light divider into an electric signal; and
   a comparator that compares the electric signal outputted by said third light detector with an output of said arithmetic operator as a reference value, to generate a detection output having a predetermined phase of said electric signal outputted by said third light detector.

2. An interference detecting system for detecting an interference phase of interference light occurring between a first laser light of a reference phase and a second laser light of a measuring phase, said interference detecting system comprising:
   a polarizing light separator that extracts, out of the interference light, two polarized light components phase-shifted from each other by 180°, said two polarized light components including a first interference light component and a second interference light component phase-shifted from said first interference light component;
   a first light detector that receives one of the light components extracted by said polarizing light separator and outputs an electric signal corresponding to the light component received thereby;
   a second light detector that receives another of the light components extracted by said polarizing light separator and outputs an electric signal corresponding to the light component received thereby;
   an arithmetic operator that performs an arithmetic operation between the electric signals outputted by said first and second light detectors, said arithmetic operation including an average-evaluating operation; and
   a comparator that compares the electric signal outputted by one of said first and second light detectors with an output of said arithmetic operator as a reference value, to thereby generate a detection output having a predetermined phase of said electric signal outputted by said third light detector.

3. An interference detecting system for detecting an interference phase of interference light occurring between a first laser light of a reference phase and a second laser light of a measuring phase, said interference detecting system comprising:
   a polarizing light separator that extracts, out of the interference light, two polarized light components phase-shifted from each other by 180°, said two polarized light components including a first interference light component and a second interference light component phase-shifted from said first interference light component;
   a first light detector that receives one of the light components extracted by said polarizing light separator and outputs an electric signal corresponding to the light component received thereby;
   a second light detector that receives another of the light components extracted by said polarizing light separator and outputs an electric signal corresponding to the light component received thereby; and
   a comparator that compares the electric signal outputted by said first and second light detectors, to thereby generate a detection output having a predetermined phase of said second laser light.

4. An interference detecting system for detecting intensity of interference light occurring between a first laser light of a reference phase and a second laser light of a measuring phase, said interference detecting system comprising:
   a light divider that divides the interference light into two interference light beams to be directed in two directions;
   a polarizing light separator that receives one of the interference light beams divided from said light divider and separates components of said first and second laser lights from the interference light beam received thereby;
   first and second light detectors that convert respective light energy of the components separated by said polarizing light separator into electric signals;
   an adder that adds together the electric signals outputted by said first and second light detectors;
   a third light detector that converts light energy of another of the interference light beams from said light divider into an electric signal;
   a subtracter that subtracts an output of said adder from an output of said third light detector;
   a first arithmetic operator that evaluates a square root of a product between the electric signals outputted by said first and second light detectors; and
   a second arithmetic operator that divides an output of said subtracter by an output of said first arithmetic operator, to provide a signal indicative of interference intensity of the interference light occurring between said first and second laser lights.

5. An interference detecting system for detecting interference intensity of interference light occurring between a first laser light of a reference phase and a second laser light of a measuring phase, said interference detecting system comprising:
   a polarizing light separator that extracts, out of the interference light, two polarized light components phase-shifted from each other by 180°, said two polarized light components including a first interference light component and a second interference light component phase-shifted from said first interference light component;

a first light detector that receives one of the light components extracted by said polarizing light separator and outputs an electric signal corresponding to the light component received thereby;

a second light detector that receives another of the light components extracted by said polarizing light separator and outputs an electric signal corresponding to the light component received thereby;

an adder that adds together the electric signals outputted by said first and second light detectors;

a subtracter that subtracts the electric signal outputted by said second light detector from the electric signal outputted by said first light detector; and an arithmetic operator that divides an output of said subtracter by an output of said adder, to thereby generate a signal indicative of the interference intensity of the interference light occurring between said first and second laser lights.

6. An interferometer comprising:

a laser beam generator that generates two parallel laser beams;

optics that divide one of the two parallel laser beams into first and second laser light beams and irradiate said first laser light beam onto a predetermined reference surface and said second laser light beam onto a first point of a test surface to thereby generate a first interference light comprising a combination of respective reflections of said first and second laser light beams, said optics also dividing another of the two parallel laser beams into third and fourth laser light beams and irradiating said third laser light beam onto the predetermined reference surface and said fourth laser light beam onto a second point of the test surface to thereby generate a second interference light comprising a combination of respective reflections of said third and fourth laser light beams; and an interference detector section that detects interference phase or intensity of said first interference light to thereby provide first detection data for said first point of the test surface irradiated by said second laser light beam and also detects interference phase or intensity of said second interference light to thereby provide second detection data for said second point of the test surface irradiated by said fourth laser light beams, wherein a level difference between said first and second points of the test surface is detected on the basis of a difference between said first and second detection data.

7. An interferometer as recited in claim 6 wherein the test surface is a surface of a recording medium and which is adapted for use in surface defect inspection of the recording medium.

* * * * *